(12) United States Patent
Gossweiler, III et al.

(10) Patent No.: US 8,832,789 B1
(45) Date of Patent: Sep. 9, 2014

(54) LOCATION-BASED VIRTUAL SOCIALIZING

(75) Inventors: Richard Carl Gossweiler, III, Sunnyvale, CA (US); Ullas Gargi, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 222 days.

(21) Appl. No.: 13/300,395

(22) Filed: Nov. 18, 2011

(51) Int. Cl.
| | | |
|---|---|---|
| *G06F 7/04* | (2006.01) | |
| *H04W 64/00* | (2009.01) | |
| *G06F 21/30* | (2013.01) | |
| *H04W 68/00* | (2009.01) | |
| *H04W 72/04* | (2009.01) | |
| *G06F 21/31* | (2013.01) | |
| *H04W 12/06* | (2009.01) | |
| *G06F 21/51* | (2013.01) | |

(52) U.S. Cl.
CPC ............ *H04W 64/003* (2013.01); *G06F 21/30* (2013.01); *H04W 68/005* (2013.01); *H04W 72/04* (2013.01); *G06F 21/31* (2013.01); *H04W 12/06* (2013.01); *G06F 21/51* (2013.01)
USPC .................... 726/2; 726/5; 455/411

(58) Field of Classification Search
CPC . H04W 64/003; H04W 68/005; H04W 72/04; H04W 72/02; H04W 72/0406; H04W 72/0426; H04W 72/0433; H04W 12/06; H04W 12/08; H04W 92/10; G06F 21/30; G06F 21/305; G06F 21/31; G06F 21/51
USPC ................ 726/2, 5; 455/455.6, 411
See application file for complete search history.

(56) References Cited

U.S. PATENT DOCUMENTS

| | | | | |
|---|---|---|---|---|
| 2004/0156326 | A1* | 8/2004 | Chithambaram | 370/310 |
| 2005/0105496 | A1* | 5/2005 | Ambrosino | 370/338 |
| 2010/0070758 | A1 | 3/2010 | Low et al. | |
| 2011/0070834 | A1* | 3/2011 | Griffin et al. | 455/41.1 |
| 2011/0079639 | A1* | 4/2011 | Khan | 235/375 |
| 2012/0062688 | A1* | 3/2012 | Shen et al. | 348/14.03 |
| 2012/0317210 | A1* | 12/2012 | Fisher et al. | 709/206 |

OTHER PUBLICATIONS

Tacken, J.; et al; "Towards a Platform for User-Generated Mobile Services"; Advanced Information Networking and Applications Workshops (WAINA), 2010 IEEE 24th International Conference on Digital Object Identifier: 10.1109/WAINA.2010.77; Publication Year: 2010, pp. 532-538.*

"Introduce yourself anywhere," [online]. mingle, 2011. First Accessed on Aug. 30, 2011. Retrieved from the Internet: <http://minglesocialapp.com/> 3 pgs.

(Continued)

*Primary Examiner* — Pramila Parthasarathy
*Assistant Examiner* — Angela Holmes
(74) *Attorney, Agent, or Firm* — Remarck Law Group PLC (57) ABSTRACT

Aspects of the present disclosure may provide a location-based multimedia experience to a user. In one example, a method includes receiving location information corresponding to a physical location of the first computing device, and outputting the location information from a first computing device to a second computing device in order to authenticate the first computing device. The method includes receiving an authentication response indicating that the first computing device has been successfully authenticated. The method may further include responsive to receiving the authentication response, receiving, one or more video communication sessions based on the location information, wherein each of the one or more video communication sessions enables communication between computing devices associated with users. The method may also include generating for display, by the first computing device, a representation of the one or more video communication sessions.

20 Claims, 6 Drawing Sheets

(56) References Cited

OTHER PUBLICATIONS

Schapsis, "Location Based Social Networks, Location Based Social apps and games—Links," [online]. BDNooZ LBS Strategies. First Accessed on Aug. 30, 2011. Retrieved from the Internet: <http://bdnooz.com/lbsn-location-based-social-networking-links/#axzz1WYLXKRT9> 66 pgs.

"Karaboo," [online]. Karaboo 2010. First Accessed on Aug. 20, 2011. Retrieved from the Internet: <http://karaboo.com/> 1 pg.

Lawler, "Yobongo: Building the Next Location-Based Social Network," [online]. Gigaom, Mar. 3, 2011. First Accessed on Aug. 30, 2011. Retrieved from the Internet: <http://gigaom.com/2011/03/03/yobongo-building-the-next-location-based-social-network> 9 pgs.

* cited by examiner

LOCATION-BASED VIRTUAL SOCIALIZING

TECHNICAL FIELD

This disclosure relates to electronic devices and, more specifically, to virtual socializing between electronic devices.

BACKGROUND

A user may socialize with his/her contacts by chatting, watching television or videos, playing games, or engaging in other activities with his/her contacts. In some instances, a user and his/her contacts may not be in the same physical location. Instead, the user and his/her contacts may rely on other mechanisms to socialize, such as talking on the phone, sending email, or text messaging.

SUMMARY

In one example, a method includes receiving, by a first computing device, location information corresponding to a physical location of the first computing device, and outputting the location information from the first computing device to a second computing device in order to authenticate the first computing device. The method may further include receiving, with the first computing device, an authentication response indicating that the first computing device has been successfully authenticated by the second computing device using the location information. The method may further include, responsive to receiving the authentication response, receiving, by the first computing device, one or more video communication sessions based on the location information, wherein each of the one or more video communication sessions enables communication between computing devices associated with users, and generating for display, by the first computing device, a representation of the one or more video communication sessions.

In one example, a computer-readable storage medium comprising instructions that, when executed, cause one or more processors of a first computing device to perform operations. The operations may include receiving, by the first computing device, location information corresponding to a physical location of the first computing device, and outputting the location information from the first computing device to a second computing device in order to authenticate the first computing device. The operations may further include receiving, with the first computing device, an authentication response indicating that the first computing device has been successfully authenticated by the second computing device using the location information. The operations may further include, responsive to receiving the authentication response, receiving, by the first computing device, one or more video communication sessions based on the location information, wherein each of the one or more video communication sessions enables communication between computing devices associated with users, and generating for display, by the first computing device, a representation of the one or more video communication sessions.

In one example, a computing device includes one or more processors and a location module operable by at least one processor to receive location information corresponding to a physical location of the computing device, wherein the location module is operable to output the location information from the computing device to a second computing device in order to authenticate the computing device. The computing device may further include a communication module operable by at least one processor to receive an authentication response indicating that the computing device has been successfully authenticated by the second computing device using the location information. In one example, the communication module is operable to receive, in response to receiving the authentication response, one or more video communication sessions based on the location information, wherein each of the one or more video communication sessions enables communication between computing devices associated with users. The computing device may further include an output device operable by at least one processor to generate for display, a representative of the one or more video communication sessions.

The details of one or more embodiments are set forth in the accompanying drawings and the description below. Other features, objects, and advantages will be apparent from the description and drawings, and from the claims.

Various embodiments have been described. These and other embodiments are within the scope of the following claims.

DETAILED DESCRIPTION

Overview

Friends, family members, or other individuals who wish to socialize or otherwise communicate may not always be in the same physical location at the time they would like to communicate. Some individuals may rely upon telephonic, text, or other forms of communication that support limited forms of socializing. For example, conventional forms of communication may support multi-way audio and/or video communication. However, some forms of communication are not sufficient to be able to give the individuals an experience similar to actually socializing in person. Talking with someone over the phone or texting someone does not create a shared experience similar to sitting a room together watching a movie or playing a game.

Rather than interacting together in the same physical location, techniques of this disclosure may, in various instances, provide a mechanism for two or more individuals in a defined location to socialize in the same virtual space (e.g., by providing a location-based multimedia experience). A location-based multimedia experience may enable multiple users to share and watch videos, share and listen to audio streams, play games, participate in video and/or audio chat, collaboratively browse the Internet, or combinations thereof. The location-based multimedia experience may provide an experience that may be comparable to socializing in person. Techniques of this disclosure may enable the creation of location-based multimedia experience that may mirror the experience of individuals hanging out in the same physical location.

In one aspect of the present disclosure, the location-based multimedia experience may be provided by a video communication session. The video communication session may enable users associated with computing devices connected to the video communication session to communicate (e.g., engage in a location-based multimedia experience). In some examples, the video communication session may enable communication between users by exchanging both audio and visual information. In some aspects of this disclosure, a user may engage in a location-based multimedia experience by coupling to a video communication session after a physical location of a computing device associated with a user has been authenticated. That is, prior to being allowed to couple to the video communication session, a user may be authenticated based on a physical location of a computing device associated with the user. For instance, when a computing device associated with a user is physically present at a defined location, the user may be presented with one or more video communication sessions available for the computing device to join. In some examples, different video communication sessions may be available based on the defined location.

In some examples, a computing device associated with a user may receive location information corresponding to a physical location for the first computing device. The computing define may output the location information to a server device in order to authenticate the computing device. For example, the server device may authenticate the computing device as being physically present at a defined location. Computing device may receive an authentication response indicating that the computing device has been successfully authenticated by the server device using the location information. The computing device may receive one or more video communication sessions based on the location information. For instance, when the computing device associated with the user is physically present in a defined location, the user may be presented with one or more video communication sessions available for the computing device to join. That is, the one or more video communication sessions may be generated based on the location information associated with a defined location used during the authentication process. The user may select one of the listed video communication sessions to join or create a new video communication session. The location-based multimedia experience provided by the video communication session may enable users to communicate with other users that may be geographically dispersed.

In some examples, the subject matter or focus of the video communication sessions may be related to the physical location at which the user must be present to join the video communication sessions. The subject matter of the video communication session may also be based on the date and time the location-based video communication session is accessed. For example, if a business would like to provide an incentive for customers to visit a physical storefront, the business may create a video communication session that includes a performance by a band or other performer. In order to join the video communication session and watch the performance, customers would be required to be physically present in the store (e.g., the defined location). In some examples, in addition to being required to be physically present in the store, customers may be required to access the video communication session during a particular time. For example, a business may provide an incentive for customers to access video communication sessions while physically present at the defined location (e.g., a store) during a particular time (e.g., business hours such as Monday through Friday from 9:00 am to 5:00 pm).

In one example, a business may provide a fiscal incentive for customers to come to the store. For example, upon a computing device associated with a customer connecting to a video communication session while the customer is physically present at the store, a coupon code or other money-saving incentive may be automatically emailed to the customer. In other examples, a fiscal incentive may be sent to customers while the customer is not physically present at the store. For example, a store may send the fiscal incentive to customers (e.g., via email) indicating that the customer may receive a financial discount if the customer participates in a location-based multimedia experience while physically present at the store (e.g., the defined location).

As used throughout this disclosure, headings are included to improve the clarity of the disclosure and are not used to define separate embodiments. In some examples, features of various embodiments may be combined and/or used from among multiple headings in accordance with aspects of the present disclosure.

Example System

Figure 1:
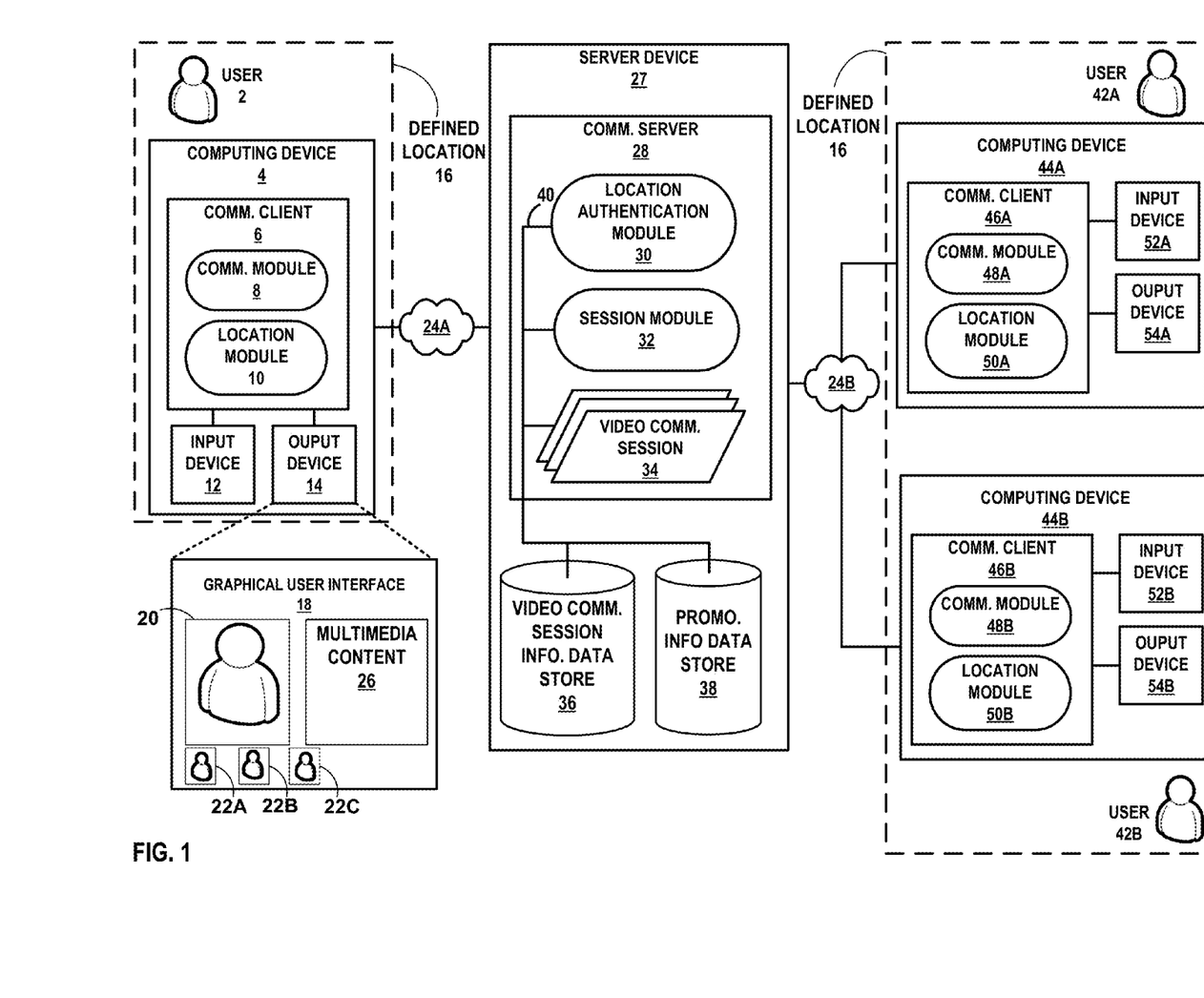
FIG. 1 is a block diagram illustrating an example of a communication system in which one or more client devices are coupled to a server device that enables communication between users associated with the client devices, in accordance with one or more aspects of the present disclosure.

FIG. 1 is a block diagram illustrating an example of a communication system in which one or more client devices are coupled to a server device that enables communication between users associated with the client devices, in accordance with one or more aspects of the present disclosure. As illustrated in FIG. 1, computing device 4 and computing devices 44A-B (collectively referred to as "computing devices 44") are coupled to server device 27 such that users associated with computing devices 4 and 44A-B may communicate.

Computing device 4 may include input device 12, output device 14, and communication client 6, which may further include communication module 8 and location module 10. As shown in the example of FIG. 1, computing devices 44 may include input devices 52A-B (collectively referred to as "input devices 52"), output devices 54A-B (collectively referred to as "output devices 54"), and communication clients 46A-B (collectively referred to as "communication clients 46"). Communication clients 46 may further include communication modules 48A-B (collectively referred to as "communication modules 48") and location modules 50A-B (collectively referred to as "location modules 50"). Computing devices 44 may be a computing device similar to computing device 4 that includes some, all, and/or different functionality than the functionality provided by computing device 4. Communication clients 48, communication module 50, and location module 50 may include some, all, and/or different functionality than the functionality provided by communication client 6, communication module 8, and location module 10.

As shown in FIG. 1, server device 27 includes communication server 28, video communication session information data store 36, and promotional information data store 38. Each of computing devices 4, 44 and server device 27 may be operatively coupled by communication channels 24A and 24B (collectively referred to as "communication channels 24"), which in some examples may be wired or wireless communication channels capable of sending and receiving data. Examples of communication channels 24 may include a 3G wireless network or a Transmission Control Protocol and/or Internet Protocol (TCP/IP) network connection over the Internet.

Computing devices 4, 44 may be operatively coupled to video communication session 34 that enables communication between user 2 associated with client device 4 and users 42A and 42B (collectively referred to as "users 42") associated with computing devices 44, respectively. Examples of computing devices 4, 44, may include, be, or be part of a mobile computing device (e.g., a mobile phone, netbook, laptop, personal digital assistant (PDA), tablet computer, portable gaming device, portable media player, e-book reader, or watch), other computing devices (e.g., a desktop computer, or set top box), or televisions with one or more processors embedded therein or attached thereto. Computing devices 4 and 44 may be the same or different types of devices. For example, computing devices 4 and 44A may both be mobile phones. In another example, computing device 4 may be a mobile phone and computing device 44A may be a desktop computer.

Computing devices 4 and 44 may include one or more input devices (e.g., input devices 12 and 52). Input devices 12, 52 may include keyboards, pointing devices, microphones, and cameras capable of recording one or more images or video. Computing devices 4 and 44 may also include one or more output devices (e.g., output device 14 and 54). Examples of output devices 14, 54 may include a video graphics card, a computer display, a sound card, and speakers.

Computing device 4 of FIG. 1 may include communication client 6. In some examples, communication client 6 may be mobile or desktop computer applications that provide functionality described herein. Communication client 6 may include communication module 8 and location module 10, as shown in FIG. 1. Communication client 6 may exchange audio, video, text, or other information with other one or more computing devices associated with other users (e.g., computing device 44A associated with user 42A). Communication module 8 may cause output devices of computing device 4 to display a graphical user interface. For instance, communication module 8 may cause output device 14 to display graphical user interface (GUI) 18.

Communication module 8 may further include functionality that enables communication clients 6 to couple to one or more video communication sessions (e.g., video communication session 34). Two or more computing devices (e.g., computing device 4 and computing devices 44) may join the same video communication session 34 to enable communication between the client devices.

Communication client 6 may include location module 10 that enables communication module 8 to send location information corresponding to a physical location of computing device 4 to server device 27. In one example, location module 10 may enable communication module 8 to send location information from computing device 4 associated with user 2 to server device 27. As discussed herein, the location information may assist server device 27 determining whether the physical location of computing device 4 associated with user 2 is within a defined location 16.

In some examples, communication module 8 may further include functionality that receives time information (e.g., a current date and time of day) from computing device 4. Communication module 8 may send the time information to server device 27. In one example, communication module 8 may send the time information (e.g., a current date and time of day) with the location information to server device 27. As discussed herein, the time information may assist server device 27 in determining which video communication session are available to a user at the date and time of day included in the time information. Additionally, the time information may further assist server device 27 in determining available financial discounts that are available to the user at the date and time of day included in the time information.

As described throughout this disclosure a user may "join" a video communication session when a user or agent client of a computing device associated with the user or agent couples, e.g., establishes a connection, to a communication server executing on a server device and/or other computing device. In some examples, a communication client executing on a computing device joins a video communication session by operatively coupling to a video communication session managed by a communication server executing on a server device and/or other computing device.

In some aspects of the present disclosure, communication client 6 may enable user 2 to participate in a location-based multimedia experience with other users that may be geographically dispersed. As further described herein, communication client 6 may couple to a video communication session after a physical location of computing device 4 has been authenticated. Other users, such as users 42 may participate in the location-based multimedia experience. For example, communications clients 46 may also couple to video communication session 34 after a physical location of computing devices 44 have been authenticated. That is, the physical location of computing devices 44 have been determined to be at defined location 16. In this way, users may socialize with other users with computing devices that are also coupled to video communication session 34. In some examples, communication client 6 may cause output device 14 to display GUI 18 when communication client 6 is coupled to a video communication session (e.g., video communication session 34). GUI 18 may include graphical elements such as video feed 20, video feeds 22A-B (collectively referred to as "video feeds 22"), and multimedia content 26. Graphical elements, more generally, may include any visually perceivable object displayable by output device 14 in GUI 18.

In the current example, input devices 52, while coupled to video communication session 34 may generate visual representations of users 42. Visual representations may include video data of a still image or a plurality of images. Communication clients 46 may send the video data to server device 27, which may determine that communication client 6 is coupled to video communication session 34. Consequently, server device 27 may send the video data of users 42 to communication client 6 as a video feed. Communication client 6, upon receiving the video feeds, may cause output device 14 to display the video feed as video feeds 22. Video feed 22A may include video data of user 42A and video feed 22B may include video data of user 42B. Communication client 6 may further cause input device 12 to generate a video feed of user 2, which may be similarly sent in a video feed to communication clients 46. Communication client 6 may further cause output device 14 to display the video feed of user 2 as video feed 22C. In this way, user 2 may view a video feed of himself or herself along with video feeds of other users associated with computing devices coupled to video communication session 34.

As illustrated in FIG. 1, GUI 18 further includes video feed 20. As discussed herein, in some instances, the video communication session 34 may be a contextual video communication session 34. That is, the subject matter, focus, and/or availability of the video communication session may be related to the physical location at which the user must be present to join the video communication session. In one example, the subject matter of the video communication session may be a performance by a band at a particular date and time. Users 2 and 42 may travel to defined location 16 to join video communication session 34 at a particular date and time. As discussed herein, defined location 16 may include a plurality of different physical locations. In one example, defined location 16 may be a plurality of stores having a same corporate parent. Once coupled to video communication session 34, users may view the performance via video feed 20, while viewing video feeds including video data of users (e.g., users 2 and 42) also viewing the performance.

In addition to exchanging video information, communication clients 6, 46 may exchange audio via video communication session 34. For instance, microphones may capture sound at or near each of computing devices 4, 44, such as voices of users 2, 42. Audio data generated by input devices 12, 52 may be exchanged between communication clients 6, 46 coupled to video communication session 34. For instance, if user 42A speaks, input device 52A may receive the sound and convert it to audio data. Communication client 46A may then send the audio data to server device 27. Server device 27 may determine communication client 6 is coupled to video communication session 34.

Upon determining that communication client 6 is coupled to video communication session 34, server device 27 may send the audio data to communication client 6. After receiving the audio data, communication client 6 may cause output devices, for example, sound cards and/or speakers of computing device 4 to output sounds based at least in part on the audio data.

In still other examples, text, such a real-time instant messages, or files may be exchanged between communication clients (e.g., communication clients 6, 46) coupled to video communication session 34 using similar techniques. As shown in FIG. 1, in addition to displaying video feeds 22A-C communication client 6 may cause output device 14 to display multimedia content 26 within GUI 20. In some examples, multimedia content 26 may include one or more documents, files, images, animations, videos, or other graphical representations. In other examples, multimedia content 26 may include sound, voice, or other audio representations.

In the example of FIG. 1, multimedia content 26 may be output by each computing device 4 and 44 contemporaneously using communication clients 6 and 46, respectively. In this way, user 2 and users 42 may simultaneously view and/or hear multimedia content 26. In some examples, multimedia content 26 may be selected by user 2 using communication client 6. In other examples, users 42 may select multimedia content that will be output contemporaneously at each computing device coupled to video communication session 34.

Communication client 6 may include communication module 8. Communication module 8 may include functionality that enables communication client 6 of computing device 4 to couple to one or more video communication sessions (e.g., video communication session 34). Two or more computing devices (e.g., computing device 4 and computing devices 44) may join the same video communication session such as video communication session 34 to enable communication between computing device 4 and computing devices 44. As discussed herein, communication module 8 may further include functionality to receive time information (e.g., a date and time of day). Computing device 4 may send the time information to server device 27 to authenticate the user associated with computing device 4. In one example, the time information may assist server device 27 in determining which video communication sessions are available to user 2 and/or to determine which financial discounts are available to user 2 based on the time information.

Communication client 6 may include location module 10. Location module 10 may include functionality enabling location module 10 to receive location information corresponding to a physical location of computing device 4. As discussed herein, computing devices 4, 44 may join a video communication session of the present disclosure when the physical location of computing device 4 is authenticated. The physical location of a computing device may be authenticated when the physical location of the computing device is at a defined location. In one example, a location may be defined by a set of boundaries, such as GPS coordinates. In another example, a location may be defined by network connectivity and/or reachability. For example, when computing device 4 is actively connected to a wireless local area network provided by and located at a store, computing device 4 may be considered authenticated as being physically located at defined location 16.

As discussed herein, defined location 16 may correspond to a store. That is, techniques of the present disclosure may enable computing devices physically located in a store to join a video communication session hosted, moderated, or otherwise provided by a business associated with the store. As discussed herein, the store may be one of a plurality of stores having a same corporate parent such that the video communication sessions comprise one or more video communication sessions between computing devices physically located in two or more different stores of the plurality of stores. For example, defined location 16 may include two different storefronts having the same corporate parent.

In one example, location module 10 may receive location information corresponding to a physical location from computing device 4 scanning a quick response (QR) code located at the physical location. For example, a store associated with defined location 16 may provide a QR code at the store. In another example, location module 10 may receive location information using near field communication (NFC) technology. For example, a NFC device (e.g., passive NFC tag) may be located at the physical location (e.g., defined location 16), and user 2 may place computing device 4, including a NFC tag, over the NFC device to receive the location information. In yet another example, location module 10 may receive the location information may include receiving global positioning system (GPS) coordinates. The GPS coordinates may be determined by a GPS radio of computing device 4.

Figure 3:
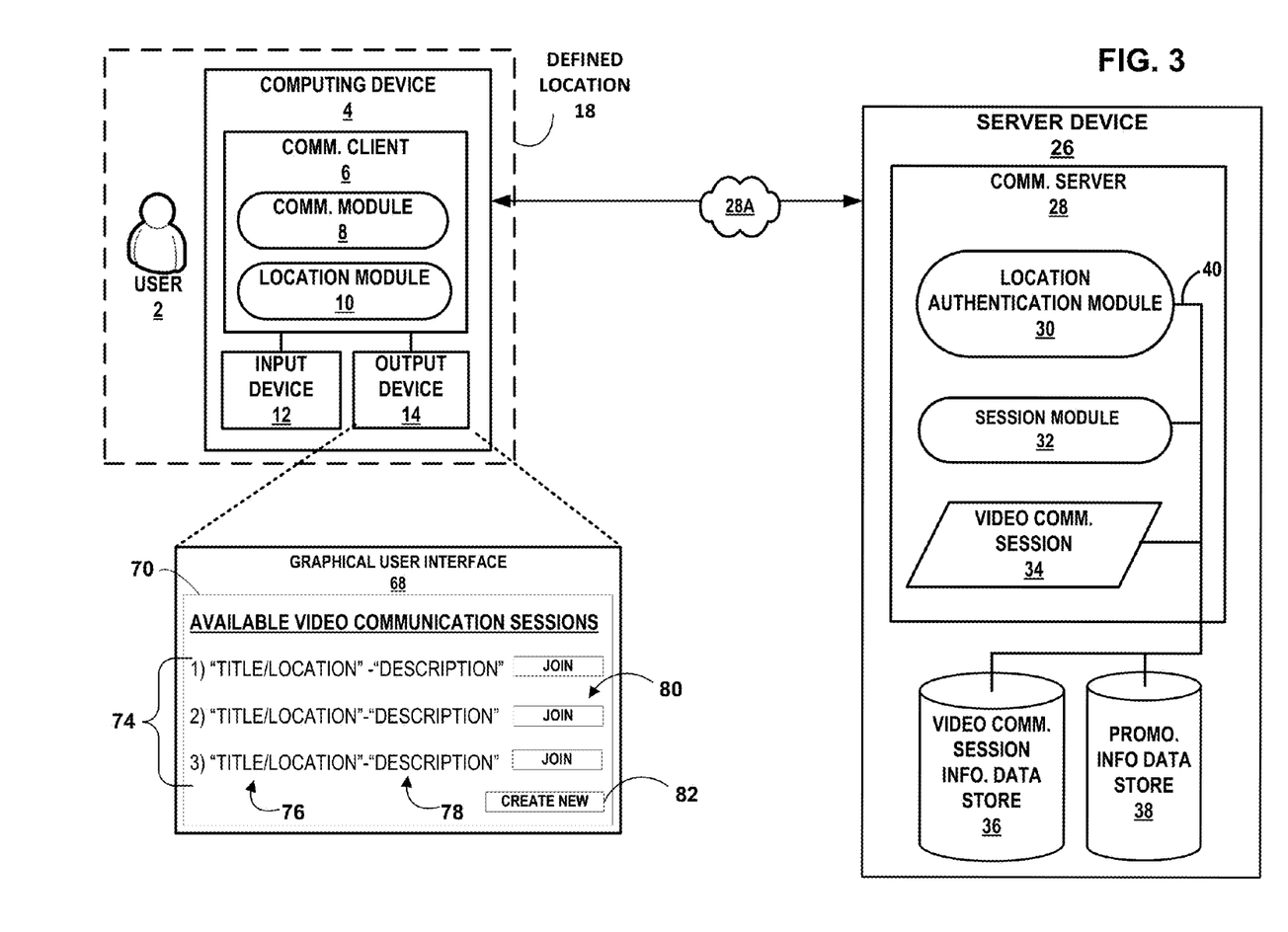
FIG. 3 is a block diagram illustrating an example graphical user interface that displays one or more video communication sessions, in accordance with one or more aspects of the present disclosure.

Location module 10 may include functionality that outputs the location information to server device 27. For example, location module 10 may output location information (e.g., GPS coordinates, QR code information, etc.) corresponding to a physical location of computing device 4 to server device 27. Location module 10 may receive an authentication response from server device 27 indicating that computing device 4 has been successfully authenticated by server device 27. For instance, server device 27 may authenticate that computing device 4 is at the defined location 16. Based on the location information computing device 4 may receive one or more video communication sessions. As discussed herein, the one or more video communication sessions may be defined by the location information. For example, at least a portion of the one or more video communication sessions may only be available for computing devices authenticated at defined location 16. Communication client 6 may generate for display a representation of the one or more video communication sessions (as illustrated in the example of FIG. 3). As discussed herein, a user may select a video communication session from the one or more video communication sessions to join or create a new video communication session.

As shown in FIG. 1, server device 27 includes communication server 28. Communication server 28 may perform one or more operations that enable computing device associated with users to couple to video communication sessions. Examples of server device 27 may include a personal computer, a laptop computer, a television with one or more processors embedded therein or coupled thereto, a handheld computer, a workstation, a data storage system, a supercomputer, or a mainframe computer. Communication server 28 may generate, manage, and terminate video communication sessions such as video communication session 34. In some examples, communication server 28 may include one or more modules executing on one or more computing devices, such as server device 27, that perform operations described herein.

As shown in FIG. 1, communication server 28 may include components such as location authentication module 30, session module 32, and video communication session 34. Server device 27 may also include components such as video communication session information data store 36 and promotional information data store 38. Server device 27 may send and receive information from communication clients coupled to video communication session 34 thereby enabling users participating in the video communication session to exchange information. Components of server device 27 may be physically, communicatively, and/or operatively coupled by communication channel 40. Examples of communication channel 40 may include a system bus, inter-process communication data structures, and/or a network connection.

In general, session module 32 may create, manage, and terminate video communication sessions, such as video communication session 34. The term "video communication session" as used herein is a broad term encompassing as its plain and ordinary meaning, including but not limited to, one or more objects, which may be stored in and/or are executable by hardware, that may enable communication clients coupled to the one or more objects to exchange information. The one or more objects may include data and/or provide functionality of a video communication session as described herein. For instance, video communication session 34 may include data that, among other things, specifies communication clients coupled to video communication session 34. Video communication session 34 may further include session information such as a duration of video communication session 34, security settings of video communication session 34, and any other information that specifies a configuration of video communication session 34. For example, if video communication session 34 is a contextual video communication session, video communication session 34 may include information regarding the particular context (e.g., a performer).

In accordance with one or more techniques of the present disclosure, location authentication module 30 may initially receive location information from communication clients executing on computing devices associated with users. For example, location authentication module 30 may receive location information corresponding to a physical location of computing device 4 associated with user 2. Location authentication module 30 may authenticate the physical location of computing device 4 based on the location information send from location module 10 of computing device 4. In some examples, authenticating the physical location of the computing device 4 based on the location information may include determining that the physical location of computing device 4 is at defined location 16. In some examples, responsive receiving the location information and authenticating that computing device 4 is at the defined location 16, location authentication module 30 may send an authentication response to computing device 4 indicating that computing device 4 has been successfully authenticated.

In response to authentication the physical location of computing device 4, location authentication module 30 may send a message to session module 32 indicating the computing device 4 has been successfully authenticated by location authentication module 30. Using the location information received from computing device 4, location authentication module 30 may also send a message to session module 32 indicating that that computing device 4 has been authenticated at defined location 16.

Upon receiving the message from location authentication module 30, session module 32 may determine one or more video communication sessions available to computing devices authenticated at defined location 16. For example, session module 32 may include functionality to determine one or more video communication sessions available to join by computing devices authenticated at defined location 16. In some examples, session module 32 may also receive time information from computing device 4. Session module 32 may determine one or more video communication sessions available to computing device 4 based on at least the location information and the time information.

In one example, upon receiving the message from location authentication module 30, session module 32 may identify the defined location in the message. Session module 32 may use the defined location indicated in the message to query video communication session information data store (VCSD) 36. Additionally, session module 32 may use the time information to query VCSD 36. VCSD 36 may include any suitable data structure to store information such as a database, lookup table, array, linked list, etc. As shown in FIG. 1 VSCD 36 may include information associated with video communication sessions. In one example, VSCD 36 may include session identifiers that identify present and future video communication sessions. For example, VSCD 36 may include session identifiers that identify the defined locations a computing device must be authenticated within prior to joining the video communication session. Additionally, VSCD 36 may include a subject identifier that identifies subjects of a video communication session. A subject, generally, may be any fact, category, classifier, or other information that may be related to a video communication session. For example, a date, a time, required defined locations, performances, among other subject identifiers, may be included in the VSCD 36. In one example, session module 32 may use the defined location and query VSCD 36 to identify one or more video communication sessions that require a computing device to be authenticated at the defined location. In this way, when session module 32 receives a message with a defined location, session module 32 may identify one or more video communication sessions associated with the defined location.

In other examples, location module 30 may include a current time of day when the location information from computing device 4 is received. Location module 30 may send the current time of day along with the location information to session module 32. In these examples, session module 32 may query VSCD 36 based on the location information and the current time of day in addition to or instead of querying VSCD 36 based on any of the previously described subject and location identifiers.

Session module 32 may send the one or more identified video communication sessions to computing device 4. In one example, the one or more video communication sessions sent to computing device 4 by session module 32 may include functionality that enables a computing device to couple to the selected video communication session. As discussed herein, communication client 6 may generate for display a representation of the one or more video communication sessions. User 2 may provide input selecting one video communication session of the one or more video communication sessions or selecting to create a new video communication session.

In other examples, user 2 may select to create a new video communication session. In these examples, session module 32 may receive a request to create a new video communication session. Session module 32, upon receiving the request may generate a video communication session and send messages to communication client 6 enabling the communication client 6 to couple to the video communication session. When coupled to a video communication session such as video communication 34, communication client 6 may cause output device 14 to display GUI 18, as discussed herein. GUI 18 may include graphical elements such as video feeds 20, 22 and multimedia content 26.

As discussed herein, businesses may provide incentives for customers to visit a store and connect to a video communication session. In one example, an incentive (e.g., a financial discount) may be offered to the user prior to the user coming to the store. For example, a user may be sent a promotional code enabling the user to receive a financial discount if the user connects to a video communication session while physically located at the store. In one example, when computing device 4 couples to a video communication session of the one or more video communication sessions or creates a new video communication while physically located at a defined location, computing device 4 may receive a financial discount. Computing device 4 may receive a financial discount (e.g., a coupon) on one or more products offered by a store associated with the location information. Session module 32 may use the defined location indicated in the message from the location authentication module 30 to query video promotional information data store (PID) 38. Additionally, session module 32 may use the time information to query PID 28. PID 38 may include any suitable data structure to store information such as a database, lookup table, array, linked list, etc.

As shown in FIG. 1 PID 38 may include information associated with various promotions of a business. In one example, PID 38 may include promotional identifiers that identify various promotions a business may be providing. For example, PID 38 may include promotional identifiers that identify a financial discount that may be provided to users that couple to a video communication session while at a defined location. In that instance, session module 32 may query PID 38 with the location information to find financial discounts available to a user coupling to a video communication session at defined location 16. Additionally, promotional identifiers may identify financial discounts that may be provided to users that couple to a video communication session at the date and time of day included in the time information.

PID 38 may also include customer identifiers that identify a particular user of a video communication session and the usage history of the particular user. Customer identifiers, generally, may be any fact, usage history, or other information that may be related to a particular user connecting to a video communication session. For example, a number of connections to video communication sessions may be monitored such that the user may be eligible to receive additional financial discounts.

Example Device

Figure 2:
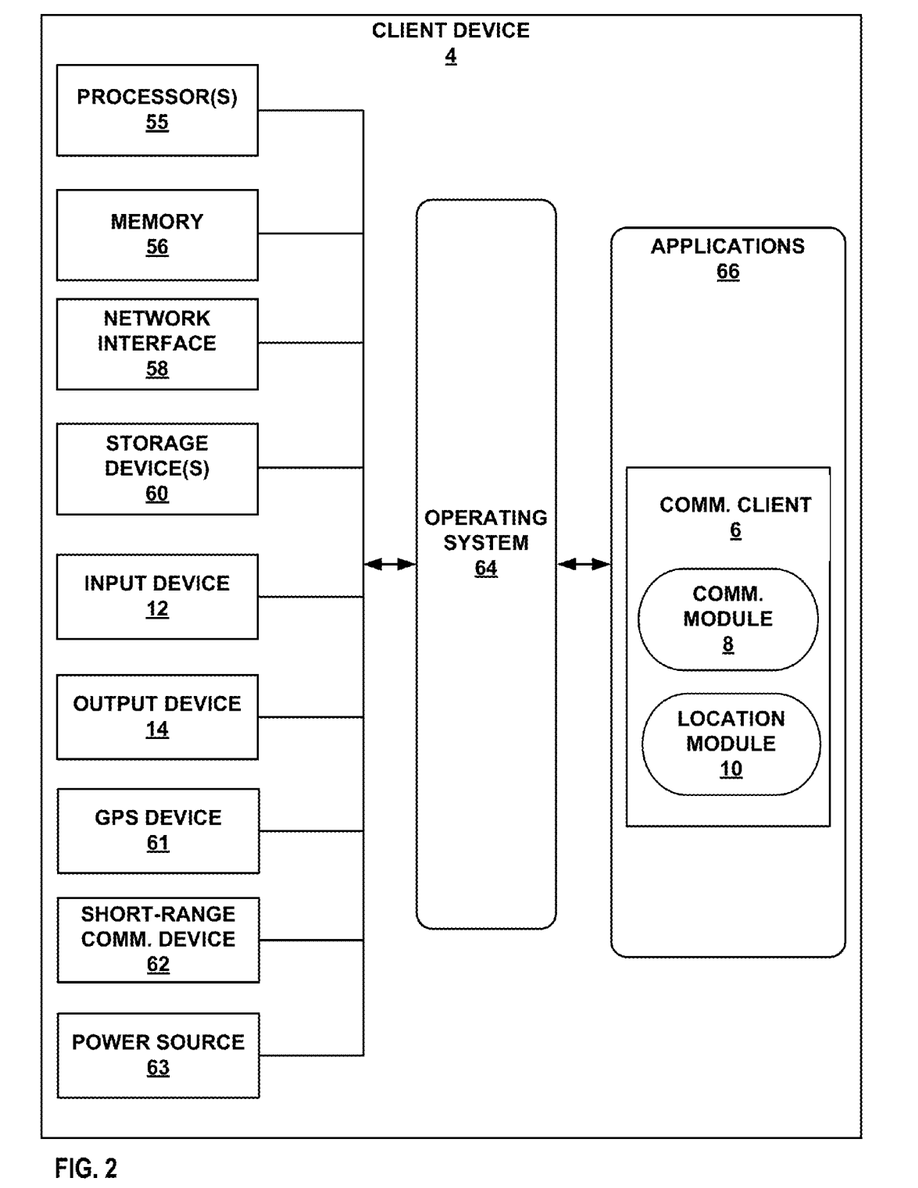
FIG. 2 is a block diagram illustrating further details of one example of a computing device shown in FIG. 1, in accordance with one or more aspects of the present disclosure.

FIG. 2 is a block diagram illustrating further details of one example of a computing device shown in FIG. 1, in accordance with one or more aspects of the present disclosure. FIG. 2 illustrates one particular example of computing device 4, and many other example embodiments of computing device 4 may be used in other instances.

As shown in the specific example of FIG. 2, computing device 4 includes one or more processors 55, memory 56, a network interface 58, one or more storage devices 60, input device 12, output device 14, GPS device 61, short-range communication device 62, and power source 63. Computing device 4 also includes an operating system 64 that is executable by computing device 4. Computing device 4, in one example, further includes applications 66 and communication client 6 that are also executable by computing device 4. As shown in FIG. 1, communication client 6 may include communication module 8 and location module 10. Each of components 55, 56, 58, 60, 12, 14, 61, 62, 63, 64, 66, and 6 may be interconnected (physically, communicatively, and/or operatively) by communication channels for inter-component communications.

Processors 55, in one example, are configured to implement functionality and/or process instructions for execution within computing device 4. For example, processors 55 may be capable of processing instructions stored in memory 56 or instructions stored on storage devices 60.

Memory 56, in one example, is configured to store information within computing device 4 during operation. Memory 56, in some examples, is described as a computer-readable storage medium. In some examples, memory 56 is a temporary memory, meaning that a primary purpose of memory 56 is not long-term storage. Memory 56, in some examples, is described as a volatile memory, meaning that memory 56 does not maintain stored contents when the computer is turned off. Examples of volatile memories include random access memories (RAM), dynamic random access memories (DRAM), static random access memories (SRAM), and other forms of volatile memories known in the art. In some examples, memory 56 is used to store program instructions for execution by processors 55. Memory 56, in one example, is used by software or applications running on computing device 4 (e.g., applications 66) to temporarily store information during program execution.

Storage devices 60, in some examples, also include one or more computer-readable storage media. Storage devices 60 may be configured to store larger amounts of information than memory 56. Storage devices 60 may further be configured for long-term storage of information. In some examples, storage devices 60 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4, in some examples, also includes a network interface 58. Computing device 4, in one example, utilizes network interface 58 to communicate with external devices via one or more networks, such as one or more wireless networks. Network interface 58 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 4 utilizes network interface 58 to wirelessly communicate with an external device such as server device 27 of FIG. 1.

Computing device 4, in one example, also includes one or more input devices 12. Input device 12, in some examples, is configured to receive input from a user through tactile, audio, or video feedback. Examples of input device 12 include a presence-sensitive screen, a mouse, a keyboard, a voice responsive system, a video camera, a microphone or any other type of device for detecting a command from a user.

One or more output devices 14 may also be included in computing device 4. Output device 14, in some examples, is configured to provide output to a user using tactile, audio, or video stimuli. Output device 14, in one example, includes a presence-sensitive screen, a sound card, a video graphics adapter card, or any other type of device for converting a signal into an appropriate form understandable to humans or machines. Additional examples of output device 14 include a speaker, a cathode ray tube (CRT) monitor, a liquid crystal display (LCD), an organic light emitting diode (OLED) display, or any other type of device that can generate intelligible output to a user.

Computing device 4, in some examples, may include a GPS device 61. In some examples, GPS device 61 may send and receive information from a global navigation satellite system. In some examples, GPS device 61 may receive one or more physical location coordinates from the global satellite system that indicates a position of computing device 4. Thus, in some examples, GPS device 61 may enable computing device 4 to determine its physical location based on the one or more physical location coordinates. Computing device 4 may further include short-range communication device 62, such as NFC as described in FIG. 1.

Computing device 4, in some examples, include one or more power source 63, which may be a battery. For example, power source 63 may be rechargeable and provide power to computing device 4. Power source 63, in some examples, is made from nickel-cadmium, lithium-ion, or other suitable material.

Computing device 4 may include operating system 64. Operating system 64, in some examples, controls the operation of components of computing device 4. For example, operating system 64, in one example, facilitates the interaction of one or more applications 66 (e.g., communication client 6) with processors 55, memory 56, network interface 58, storage device 60, input device 12, output device 14, GPS device 61, and short-range communication device 63. As shown in FIG. 2, communication client 6 may include communication module 8 and location module 10, as described in FIG. 1. Applications 66, communication module 8, and location module 10 may each include program instructions and/or data that are executable by computing device 4. For example, communication module 8 and location module 10 may include instructions that cause communication client 6 executing on computing device 4 to perform one or more of the operations and actions described in the present disclosure.

In accordance with aspects of the present disclosure, location module 10 may initially receive location information corresponding to a physical location of computing device 4. Computing device 4 may output the location information to server device 27. Communication module 8 may receive an authentication response indicating that computing device 4 has been successfully authenticated by server device 27 using the location information. Responsive to receiving the authentication response, communication module 8 may receive one or more video communication sessions based on the location information. In the current example, communication module 8 may generate for display a representation of the one or more video communication sessions.

Example Interface

FIG. 3 is a block diagram illustrating an example graphical user interface that displays one or more video communication sessions, in accordance with one or more aspects of the present disclosure. As shown in FIG. 3, computing device 4 includes communication client 6, input device 12 and output device 14. Communication client 6 may include communication module 8 and location module 10. Communication module 8 may cause output device 14 to display GUI 68.

In one example, computing device 4, in response to receiving the authentication response from server device 27, may receive one or more video communication sessions based on the location information (e.g., location information associated with defined location 16). In some examples, communication client 6 may generate for display a representation 70 of the one or more video communication sessions. Representations 70 may include graphical elements such as video feeds, visual representations, and multimedia content. Graphical elements, more generally, may include any visually perceivable objects displayable by output device 14 in GUI 68. As illustrated in FIG. 3, representations 70 may include displaying available video communication sessions. In this example, representation 70 may display one or more video communication sessions 74. As shown in FIG. 3, the one or more video communication sessions 74 is displayed as a list and includes the video communication sessions that are available to a user authenticated at a physical location (e.g., defined location 16). As discussed herein, communication module 8 may receive one or more video communication sessions 74 from session module 32 after location authentication module 30 has authenticated a physical location of computing device 4.

In some examples, title/location 76 of the video communication sessions along with description 78 of each video communication session may be displayed. For example, if the one or more video communication sessions 74 includes a performance by a band, title/location 76 may include the title of the band and the physical location that the band is performing. Additionally, description 78 may include additional details regarding the performance (e.g., type of music, history of the band, etc.).

User 2 may select a video communication session of the one or more video communication sessions 74 by providing a user input selecting join button 80 via GUI 68. In response to receiving the selection of one of the video communication session from the one or more video communication sessions 74, computing device 4 may couple to the selected video communication session.

In some examples, user may wish to create a new video communication session instead of joining an already existing video communication session. In that instance, computing device 4 may receive a request to create a new video communication session. For example, user 2 may provide an input selecting create new button 82 via GUI 68. Responsive to receiving the request to create a new video communication session, computing device 4 may initiate the new communication session. In some examples, computing device 4 may send an initiation request to session module 32 that may create the video communication session and couple computing device 4 to the created video communication session. Additionally, in various instances, the new video communication session may be included in the one or more video communication sessions 74 displayed within GUI 68.

Example Interface

Figure 4:
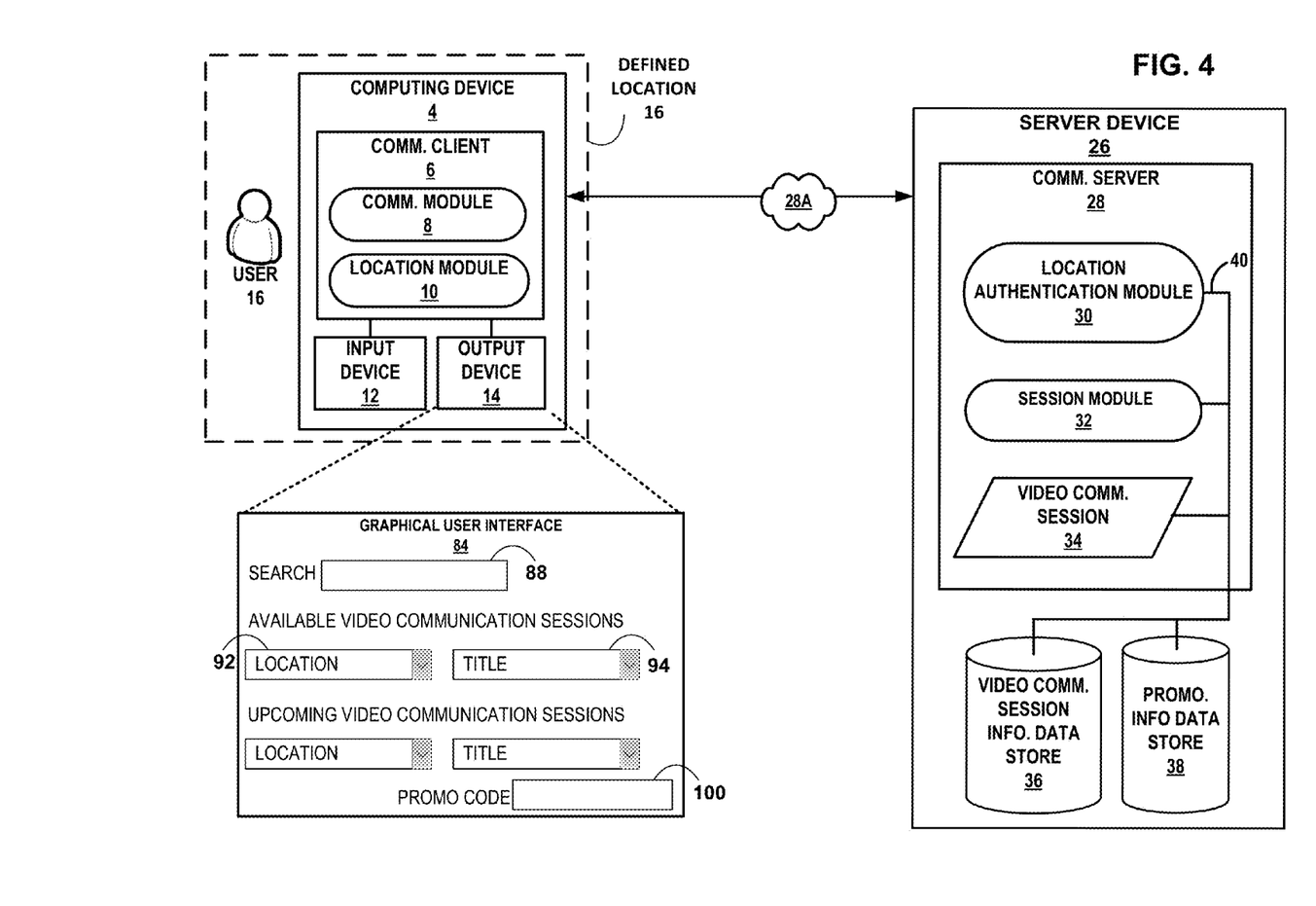
FIG. 4 is a block diagram illustrating an example graphical user interface that enables a user to communicate with one or more users participating in a video communication session, in accordance with one or more aspects of the present disclosure.

FIG. 4 is a block diagram illustrating an example graphical user interface that enables a user to communicate with one or more users participating in a video communication session, in accordance with one or more aspects of the present disclosure. As shown in FIG. 4, computing device 4 includes communication client 6, input device 12 and output device 14. Communication client may include communication module 8 and location module 10. Communication module 8 may cause output device 14 to display GUI 68.

In one example, computing device 4, in response to receiving the authentication response from server device 27, communication client 6 may generate for display GUI 84. GUI 84 may include graphical elements such as video feeds, visual representations, and multimedia content. Graphical elements, more generally, may include any visually perceivable objects displayable by output device 14 in GUI 84. As illustrated in FIG. 4, GUI 84 may enable a user to search for available video communication sessions. For example, if user 2 would like to join a video communication session involving a particular performance (e.g., a band, a book reading) user 2 may enter a search term into input box 88. Additionally, GUI 84 may display currently available video communication session and upcoming video communication sessions. In some examples, the currently available and upcoming video communication sessions displayed in GUI 84 may include the video communication sessions that correspond to the search terms entered into text box 88. As discussed herein, available video communication sessions may be existing video communication sessions that user 2 may join based on the location information (e.g., the defined location 16). Upcoming video communication sessions may include upcoming video communication sessions that will be available for user 2 to join at the defined location 16 at particular time in the future (e.g., an upcoming concert that will be held later in the day and broadcast over a video communication session). As illustrated in FIG. 4, user 2 may search for available video communication sessions and upcoming video communication sessions by location 92 and/or a title 94 of the video communication session. In other examples, user 2 may search based on time, date, subject matter, or any other criteria.

As discussed herein, a user may be provided with a promotional code prior to joining a video communication session. In one example, a user may be emailed a promotion including a promotion al code that offers a financial discount to the user if the user joins a video communication while at a defined location (e.g., a store). As shown in FIG. 4, GUI 84 may enable a user to enter a promo code. For example, user 2 may enter a promo code in input box 100. In one example, communication module 8 may send the entered promo code to session module 32. Session module 32 may query PID 38 to determine what financial discount is associated with the entered promo code. In response to determining the financial discount, session module 32 may send the promo code to computing device 4 if computing device 4 joins and/or creates a video communication session.

Example Interface

Figure 5:
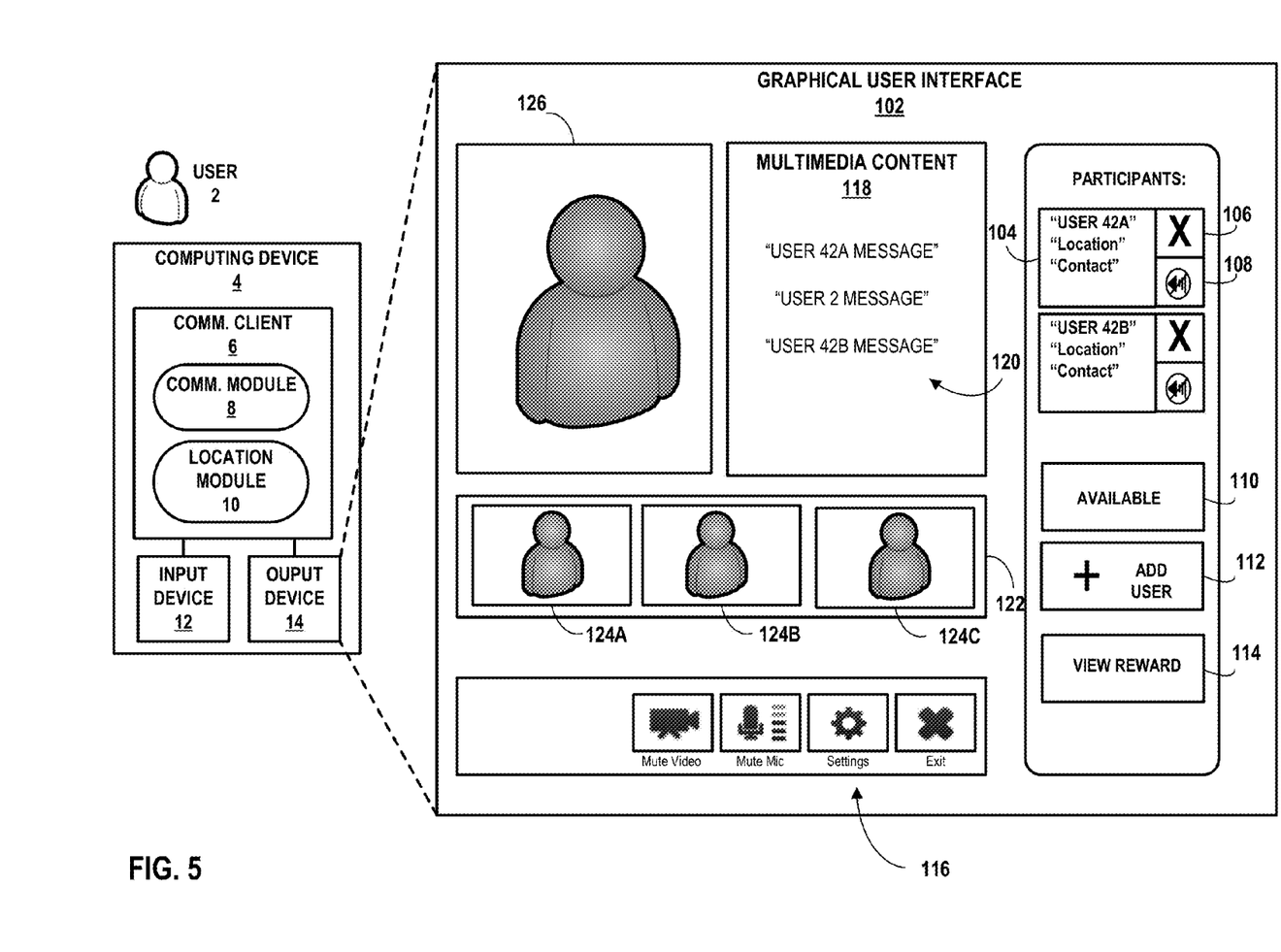
FIG. 5 is a block diagram illustrating an example graphical user interface that enables a user to communicate with other users in a video communication session, in accordance with one or more aspects of the present disclosure.

FIG. 5 is a block diagram illustrating an graphical user interface that enables a user to communicate with other users in a video communication session, in accordance with one or more aspects of the present disclosure. As shown in FIG. 5 computing device 4 includes communication client 6, input device 12 and output device 14. Communication client 6 includes communication module 8 and location module 10. Communication module 6 may cause output device 14 to display GUI 102. GUI 102 may include control buttons 106-116. GUI 102 may further include user information 104.

As shown in FIG. 5, GUI 102 may provide one or more video feeds 126, 124A-C (collectively referred to as "video feeds 124") and multimedia content 118. Video feeds 124 may be associated with users participating in a video communication session. For instance, video feed 124A may include a visual representation of user 42A that is generated by communication module 48A based on input data from input device 52A (e.g., a video camera). Video feed 124B may include a visual representation of user 42B that is generated by communication module 48B based on input data from input device 52B (e.g., a video camera). Additionally, video feed 124C may include visual representations of user 2. As discussed herein, video feed 126 may be a video feed of a performance. For example, a particular store may be featuring a performance and users authenticated at other related stores (e.g., stores that have the same corporate parent), may join a video communication session to view the performance.

In some examples, multimedia content 118 may include graphical content 160. Graphical content 118 may include communication between users of the video communication session. As illustrated in FIG. 5, multimedia content 118 may include text, such a real-time instant messages, or files that may be exchanged between users of the video communication session. As discussed herein, users may receive video and audio data of others users of the video communication sessions. However, in some examples, audible communication may be replaced by real-time instant messaging.

In some examples, GUI 102 may include user information 104 that is associated with users of the video communication session. For example, as shown in FIG. 5, user information 104 may include information regarding "USER 42A" and "USER 42B". For instance, when a computing device associated with "USER 42A" is coupled to the video communication session, the communication server may select user information associated with each user and send the profile information to computing device 4. Communication module 6, upon receiving the user information may cause output device 14 to display the user information in GUI 102. User information may include attributes associated with a user. For instance, user information may include a name of user 42A participating in the video communication session, the location of user 42A, contact information, and other attributes of user 42A.

GUI 102 may further include control button 142 that when selected causes communication client 6 to send a message to server device 27 to remove a user from GUI 102. For example, user 2 may wish to watch a performance (e.g., video feed 154) and not communicate with other viewers. As such, user 2 may select control button 142 to remove users from GUI 102.

In some examples, GUI 102 may include control button 108 which may modify a volume level of an audio stream associated with a computing device of a user that is sent by the communication server to computing devices coupled to a video communication session. For example, control button 108 may be associated with "USER 42A" as indicated by user data 104. User 2 may wish to modify a volume level of an audio feed associated with "USER 42A" that is sent by a communication server to computing devices coupled to the communication server.

To modify the volume level, user 2 may provide a user input to select control button 108. In response to the selection, communication module 6 may generate a message that indicates a modification to the volume level. In some examples, modifying a volume level may include muting or unmuting an audio stream, while in other examples modifying a volume level may include changing the volume of the audio stream from a lower volume to a higher volume or higher volume to lower volume. Communication module 6 may then send the message to a communication server. The communication server, upon receiving the message may modify the volume level associated with the audio stream based at least in part on the message, which indicates the volume level modification.

In some examples, GUI 102 may include control button 110 to indicate availability of user 2 for communication. For instance, user 2 may wish to be available to communicate with other uses and may indicate so by selecting control button 110. If user 2 does not want to be available for communication, user 2 may deselect control button 110 to indicate that he or she is not available for communication/socializing. For example, if user 2 wants to be available, user 2 may select control button 110. In response to receiving a user input selecting control button 110 to indicate availability, communication module 6 may generate a message that indicates that the user 2 associated with the communication client 6 is available.

In some examples, GUI 102 may include a control button 112 to add or invite one or more other users to the video communication session. For instance, user 2 may provide a user input to select control button 112 that causes communication module 8 to display a menu that enables user 2 to indicate one or more users that may be added to the video communication session. In response to receiving a user input to select one or more users to be added, communication client 6 may send a message to a communication server to invite the selected users.

In some examples, GUI 102 may include a control button 114 to view a reward or incentive available to user 2. For instance, user 2 may provide a user input to select control button 114 that causes communication module 8 to send user 2 a reward (e.g., a coupon, a discount, a promotional item, or other incentive). As discussed herein, businesses may provide rewards or incentives for customers to come to a store and join a video communication session. Thus, user 2 may select control button 114 to view and select an incentive provided by the business.

In some examples, GUI 102 may include control buttons 116 for controlling various aspects of the video communication session. For example, user 2 may wish to modify a volume level of an audio feed associated with user 2 that is sent by communication module 8 to computing devices coupled to the communication server. To modify the volume level and/or video data may be performed in a similar manner as previously described for control button 108. Additionally, user 2 may decouple communication client 6 from a video communication session by providing user input selecting "Exit" from control buttons 116. Moreover, user 2 may access various settings of the video communication session by providing user input selecting "Settings" from control buttons 116.

Example Process

Figure 6:
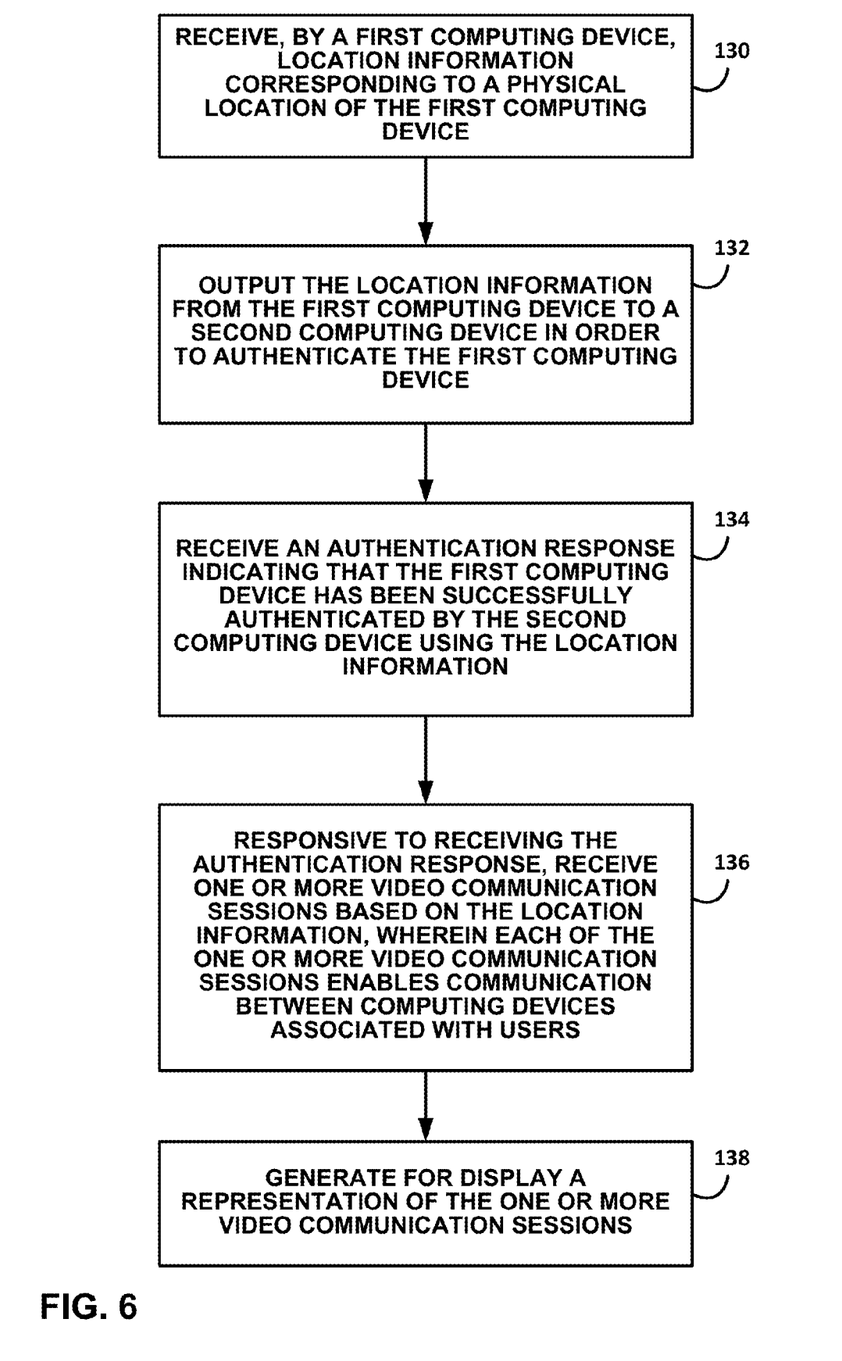
FIG. 6 is a flow diagram illustrating an example process for receiving one or more video communication sessions based on location information, in accordance with one or more aspects of this disclosure.

FIG. 6 is a flow diagram illustrating an example process for receiving one or more video communication sessions based on location information, in accordance with one or more aspects of this disclosure. For purposes of illustration only, the example process is described below within the context of FIG. 1. The example process illustrated in FIG. 6 may be performed by computing device 4 shown in at least FIG. 1.

The process of FIG. 6 includes receiving, by a first computing device, location information corresponding to a physical location of the first computing device (130). For example, location module 10 may receive location information corresponding to a physical location of computing device 4 (e.g., that computing device 4 is at defined location 16). The process also includes, outputting the location information from the first computing device to a second computing device in order to authenticate the first computing device (132). For example, location module 10 may output the location information from computing device 4 to server device 27. The process also includes, receiving, with the first computing device, an authentication response indicating that the first computing device has been successfully authenticated by the second computing device using the location information (134). For example, computing device 4 may receive an authentication response from location authentication module 30 of server device 27.

The example process may include responsive to receiving the authentication response, receiving, by the first computing device, one or more video communication sessions based on the location information, wherein each of the one or more video communication sessions enables communication between computing devices associated with users (136). For example, computing device 4 may receive one or more video communication sessions based on the location information (e.g., defined location 16). The example process further includes generating for display, by the first computing device, a representation of the one or more video communication sessions. For example, communication module 8 may cause output device 14 to display the one or more video communication sessions via GUI 18.

In one example, the process may include receiving, by the first computing device, time information corresponding to a current date and time. For example, communication module 8 may receive time information corresponding to a current date and time of day. The process may include outputting the time information from the first computing device to the second computing device in order to authenticate the first computing device. For example, communication module 8 may output the time information from computing device 4 to server device 27. The process may include receiving, with the first computing device, a second authentication response indicating that the first computing device has been successfully authenticated by the second computing device using the time information. For example, computing device 4 may receive the second authentication response from session module 32 of server device 27. The process may include responsive to receiving the second authentication response, receiving, by the first computing device, the one or more video communication sessions. For example, computing device 4 may receive one or more video communication sessions based on the time information (e.g., a current date and time of day). In the example process, the one or more video communication sessions may be based on the location information and the time information.

In one example, responsive to receiving a selection of one of the one or more video communication sessions, the process may include receiving, by the first computing device, a message from a second computing device, wherein the message enables the first computing device to couple to the selected video communication session.

The process may include when the first computing device is coupled to the selected video communication session, receiving, by the first computing device, data representative of a financial discount on one or more products offered by a store associated with the location information. For example, when computing device 4 couples to a video communications session (e.g., video communication session 34), session module 32 may query PID 38 for available financial discounts and said any financial discounts to computing device 4.

In some example, the location information may correspond to a store. Additionally, the one or more video communication sessions may comprise one or more video communication sessions between a plurality of computing devices physically located in the store. In some examples, the store is one of a plurality of stores having a same corporate parent, and the one or more video communication sessions comprise one or more video communication sessions between the plurality of computing devices physically located in two or more different stores of the plurality of stores.

In one example, receiving the one or more video communication sessions may further include determining, by the first computing device, a current time of day, and receiving the one or more video communication sessions based on the location information and the current time of day. Additionally, the one or more video communication sessions may include video communication sessions available to the first computing device at the physical location of the first computing device and at the current time.

In one example, responsive to receiving a request to create a new video communication session, initiating, by the first computing device, the new video communication session. The process may further include responsive to initiating the new video communication session, receiving a message from the second computing device, wherein the message enables the first computing device to couple to the new video communication session. In some example, the new video communication session is included in the one or more video communication sessions.

In some examples, receiving the location information may include scanning, by the first computing device, a QR code located at the physical location. In another example, receiving the location information may include receiving the location information from a NFC device located at the physical location. In yet another example, receiving the location information may include receiving GPS coordinates, where the GPS coordinates are determined by a GPS radio of the first computing device.

In some example, the one or more video communication sessions may include one or more asynchronous video messages. The process may include responsive to receiving a selection of one of the one or more asynchronous video messages, receiving, by the first computing device, data representative of the asynchronous video message, and generating for display by the first computing device, a representation of the asynchronous video message.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments have been described. These and other embodiments are within the scope of the following claims

The invention claimed is:

1. A computer-implemented method, comprising:
    receiving, by a first computing device, location information corresponding to a physical location of a second computing device;
    determining, at the first computing device, whether the physical location of the second computing device corresponds to the second computing device being present at a defined location, the defined location being within a set of boundaries;
    when the second computing device is determined to be present at the defined location, authenticating, at the first computing device, the second computing device;
    when the second computing device is authenticated at the defined location, providing, from the first computing device and to the second computing device, access to one or more restricted access video communication sessions, the one or more video communication sessions being restricted to users that have been authenticated by being present at the define location,
    wherein each of the one or more video communication sessions enables communication between computing devices associated with users.

2. The method of claim 1, further comprising:
    receiving, at the first computing device, a selection of a particular video communication session of the one or more video communication sessions from the second computing device; and
    providing, from the first computing device, the particular video communication session to the second computing device for display.

3. The method of claim 1, further comprising:
    receiving, by the first computing device, time information corresponding to a current date and time; and
    determining, at the first computing device, whether the current date and time corresponds to the second computing device being present at the defined location at a defined date and time,
    wherein authenticating the second computing device comprises authenticating the second computing device when the second computing device is determined to be present at the defined location at the defined date and time, and wherein the one or more video communication sessions are restricted to users that have been authenticated by being present at the define location at the defined date and time.

4. The method of claim 1, wherein the one or more video communication sessions comprise one or more video communication sessions between a plurality of computing devices physically located at the defined location.

5. The method of claim 1, further comprising:
receiving, at the first computing device, a request to create a new video communication session from the second computing device;
initiating, by the first computing device, the new video communication session; and
providing, from the first computing device and to the second computing device, a message that enables the second computing device to couple to the new video communication session, wherein the new video communication session is included in the one or more video communication sessions.

6. The method of claim 1, wherein receiving the location information from the second computing device comprises receiving a scan of a quick response (QR) code located at the physical location.

7. The method of claim 1, wherein receiving the location information from the second computing device comprises receiving global positioning system (GPS) coordinates, wherein the GPS coordinates are determined by a GPS radio of the second computing device.

8. The method of claim 1, wherein the one or more video communication sessions includes one or more asynchronous video messages.

9. The method of claim 3, wherein the one or more video communication sessions comprise one or more video communication sessions between a plurality of computing devices physically located at the defined location at the defined date and time.

10. The method of claim 9, wherein a plurality of different physical locations are included in the defined location.

11. The method of claim 10, wherein the defined location includes a plurality of stores having a same corporate parent, and wherein the one or more video communication sessions comprise one or more video communication sessions between the plurality of computing devices physically located in two or more different stores of the plurality of stores.

12. The method of claim 4, wherein a plurality of different physical locations are included in the defined location.

13. The method of claim 8, further comprising:
receiving, at the first computing device, a selection of a particular asynchronous video message of the one or more video communication sessions from the second computing device; and
providing, from the first computing device, the particular asynchronous video message to the second computing device for display.

14. A non-transitory computer-readable storage medium comprising instructions that, when executed, cause one or more processors of a first computing device to perform operations comprising:
receiving location information corresponding to a physical location of a second computing device;
determining whether the physical location of the second computing device corresponds to the second computing device being present at a defined location, the defined location being within a set of boundaries;
when the second computing device is determined to be present at the defined location, authenticating the second computing device;
when the second computing device is authenticated at the defined location, providing to the second computing device, access to one or more restricted access video communication sessions, the one or more video communication sessions being restricted to users that have been authenticated by being present at the define location,
wherein each of the one or more video communication sessions enables communication between computing devices associated with users.

15. The non-transitory computer-readable storage medium of claim 14, wherein a plurality of different physical locations are included in the defined location.

16. The non-transitory computer-readable storage medium of claim 14, wherein the operations further comprise:
receiving a selection of a particular video communication session of the one or more video communication sessions from the second computing device; and
providing the particular video communication session to the second computing device for display.

17. The non-transitory computer-readable storage medium of claim 14, wherein the operations further comprise:
receiving time information corresponding to a current date and time; and
determining whether the current date and time corresponds to the second computing device being present at the defined location at a defined date and time,
wherein authenticating the second computing device comprises authenticating the second computing device when the second computing device is determined to be present at the defined location at the defined date and time, and
wherein the one or more video communication sessions are restricted to users that have been authenticated by being present at the define location at the defined date and time.

18. A first computing device, comprising:
at least one hardware processor; and
a non-transitory computer-readable storage medium comprising instructions that, when executed by the at least one hardware processor, cause the first computing device to perform operations comprising:
receiving location information corresponding to a physical location of a second computing device;
determining whether the physical location of the second computing device corresponds to the second computing device being present at a defined location, the defined location being within a set of boundaries;
when the second computing device is determined to be present at the defined location, authenticating the second computing device;
when the second computing device is authenticated at the defined location, providing to the second computing device, access to one or more restricted access video communication sessions, the one or more video communication sessions being restricted to users that have been authenticated by being present at the define location,
wherein each of the one or more video communication sessions enables communication between computing devices associated with users.

19. The first computing device of claim 18, wherein a plurality of different physical locations are included in the defined location.

20. The first computing device of claim 18, wherein the operations further comprise:
  receiving a selection of a particular video communication session of the one or more video communication sessions from the second computing device; and
  providing the particular video communication session to the second computing device for display.

\* \* \* \* \*